(12) United States Patent
Li et al.

(10) Patent No.: US 12,054,901 B1
(45) Date of Patent: Aug. 6, 2024

(54) UNPOWERED-FILTERING SEWAGE CLEANING DEVICE

(71) Applicant: FARMLAND IRRIGATION RESEARCH INSTITUTE, CAAS, Xinxiang (CN)

(72) Inventors: Peng Li, Xinxiang (CN); Qibiao Han, Xinxiang (CN); Jinshan Li, Xinxiang (CN); Hao Li, Xinxiang (CN); Yang Liu, Xinxiang (CN); Yayang Feng, Xinxiang (CN)

(73) Assignee: FARMLAND IRRIGATION RESEARCH INSTITUTE, CAAS, Xinxiang (CN)

( * ) Notice: Subject to any disclaimer, the term of this patent is extended or adjusted under 35 U.S.C. 154(b) by 0 days.

(21) Appl. No.: 18/029,683

(22) PCT Filed: Nov. 21, 2022

(86) PCT No.: PCT/CN2022/133082
§ 371 (c)(1),
(2) Date: Mar. 31, 2023

(87) PCT Pub. No.: WO2024/016537
PCT Pub. Date: Jan. 25, 2024

(30) Foreign Application Priority Data

Jul. 22, 2022 (CN) .......................... 202210860745.X

(51) Int. Cl.
*E02B 15/10* (2006.01)
*B01D 33/27* (2006.01)

(52) U.S. Cl.
CPC ............ *E02B 15/103* (2013.01); *B01D 33/27* (2013.01)

(58) Field of Classification Search
CPC ...... E02B 15/103; E02B 15/10; E02B 15/102; B01D 33/27
(Continued)

(56) References Cited

FOREIGN PATENT DOCUMENTS

| CN | 204000809 U | 12/2014 |
| CN | 204401568 U | * 6/2015 |

(Continued)

OTHER PUBLICATIONS

Zhao et al, CN 204401588 U, English machine translation, pp. 1-8 (Year: 2015).*

(Continued)

*Primary Examiner* — Claire A Norris
(74) *Attorney, Agent, or Firm* — Bayramoglu Law Offices LLC

(57) ABSTRACT

An unpowered-filtering sewage cleaning device includes a sewage discharge mechanism, a water conveyance mechanism, a filtration mechanism, a water guidance mechanism, a water discharge mechanism, a support mechanism, and a transmission mechanism. The transmission mechanism includes a main transmission shaft, a clutch mechanism, and an auxiliary transmission shaft. The main transmission shaft is mounted with the auxiliary transmission shaft through the clutch mechanism. In case of disengagement of the clutch mechanism, the main transmission shaft rotates, while the auxiliary transmission shaft does not rotate. In case of engagement of the clutch mechanism under a pressure, the main transmission shaft drives the auxiliary transmission shaft to rotate coaxially. The water conveyance mechanism, the filtration mechanism, and the water guidance mechanism are mounted with the main transmission shaft. The sewage discharge mechanism is mounted with the auxiliary transmission shaft. The unpowered-filtering sewage cleaning device has a simple structure.

4 Claims, 7 Drawing Sheets

(58) Field of Classification Search
USPC .......................................................... 210/767
See application file for complete search history.

(56) References Cited

FOREIGN PATENT DOCUMENTS

| | | |
|---|---|---|
| CN | 212248455 U | 12/2020 |
| CN | 113186887 A | 7/2021 |
| CN | 114960588 A | 8/2022 |
| JP | 6564979 B1 | 8/2019 |
| KR | 100739844 B1 | 7/2007 |

OTHER PUBLICATIONS

Wan et al, CN 113186887 A, English machine translation, pp. 1-8 (Year: 2021).*

* cited by examiner

UNPOWERED-FILTERING SEWAGE CLEANING DEVICE

CROSS REFERENCE TO THE RELATED APPLICATIONS

This application is the national phase entry of International Application No. PCT/CN2022/133082, filed on Nov. 21, 2022, which is based upon and claims priority to Chinese Patent Application No. 202210860745.X, filed on Jul. 22, 2022, the entire contents of which are incorporated herein by reference.

TECHNICAL FIELD

The present disclosure relates to an unpowered-filtering sewage cleaning device and belongs to the field of sewage treatment equipment.

BACKGROUND

As an important water conservancy project, waterlogging drainage is crucial to promote the development and economy of rural areas. Waterlogging drainage is mainly intended to prevent surface water ponding and timely remove ponded water from the ground. Prior drainage devices mainly include water-collecting wells, drainage ditches, drainage pump stations, etc. These drainage devices have a single function without consideration for sewage discharge, a poor environmental adaptability with no adaptation for use on both land and water, and a high operation cost, and fail to meet user requirements of waterlogging drainage and sewage cleaning due to the drainage devices being made for relatively fixed service conditions and having a low utilization rate, etc.

SUMMARY

The present disclosure provides an unpowered-filtering sewage cleaning device, which can effectively solve problems of prior drainage devices that the prior drainage devices have no consideration for sewage discharge, a poor environmental adaptability with no adaptation for use on both land and water, and a high operation cost, and fail to meet user requirements of waterlogging drainage and sewage cleaning due to the drainage devices being made for relatively fixed service conditions and having a low utilization rate, etc.

The present disclosure adopts the following technical solution.

An unpowered-filtering sewage cleaning device includes a sewage discharge mechanism, a water conveyance mechanism, a filtration mechanism, a water guidance mechanism, a water discharge mechanism, a support mechanism, and a transmission mechanism. The support mechanism includes a suspension mechanism, a sewage discharge port, a water inlet, a main water baffle, a support base, and a bracket. The suspension mechanism and the bracket are fixed on the support base. The main water baffle is rigidly connected to the support base. The sewage discharge port and the water inlet are positioned on the main water baffle. The bracket provides support for all components of the device. The suspension mechanism is configured to fix and mount an apparatus. The transmission mechanism includes a main transmission shaft, a clutch mechanism, and an auxiliary transmission shaft. The main transmission shaft is mounted with the auxiliary transmission shaft through the clutch mechanism. In case of disengagement of the clutch mechanism, the main transmission shaft rotates, while the auxiliary transmission shaft does not rotate. In case of engagement of the clutch mechanism under a pressure, the main transmission shaft drives the auxiliary transmission shaft to rotate coaxially. The water conveyance mechanism, the filtration mechanism, and the water guidance mechanism are mounted with the main transmission shaft. The sewage discharge mechanism is mounted with the auxiliary transmission shaft.

Preferably, the clutch mechanism includes a clutch mechanism case, a pressure rod, a disengagement sleeve, a main pressure plate, a friction piece, an auxiliary pressure plate, and a reset spring. The disengagement sleeve penetrates the clutch mechanism case and extends into the clutch mechanism case. The disengagement sleeve is fixed with the main pressure plate through a push rod. The reset spring includes one end fixed on the clutch mechanism case, and the other end fixed on the main pressure plate. The main transmission shaft passes through the disengagement sleeve and the main pressure plate to be fixed with the friction piece. The auxiliary transmission shaft passes through the clutch mechanism case to be fixed with the auxiliary pressure plate. One end of the pressure rod is fixed with a portion of the disengagement sleeve located outside the clutch mechanism case, and the other end of the pressure rod is mounted with the filtration mechanism.

Preferably, the clutch mechanism includes a clutch mechanism case, a pressure rod, a disengagement sleeve, a main pressure plate, a positioning plate, an auxiliary pressure plate, and a reset spring. The disengagement sleeve penetrates the clutch mechanism case and extends into the clutch mechanism case. The disengagement sleeve is fixed with the main pressure plate through a push rod. The reset spring includes one end fixed on the clutch mechanism case, and the other end fixed on the main pressure plate. A positioning post is provided on the positioning plate. A pressure plate positioning groove is formed in the auxiliary pressure plate. The main transmission shaft passes through the disengagement sleeve and the main pressure plate to be fixed with the positioning plate. The auxiliary transmission shaft passes through the clutch mechanism case to be fixed with the auxiliary pressure plate. One end of the pressure rod is fixed with a portion of the disengagement sleeve located outside the clutch mechanism case, and the other end of the pressure rod is mounted with the filtration mechanism.

Preferably, the sewage discharge mechanism includes a sewage discharge conveyor belt, an automatic sewage discharge mechanism, and a sewage discharge tank. The sewage discharge conveyor belt and the sewage discharge tank are provided on the support base. One end of the sewage discharge conveyor belt is provided under the sewage discharge port, and the other end of the sewage discharge conveyor belt is provided on the sewage discharge tank. The automatic sewage discharge mechanism includes a main belt pulley, an auxiliary belt pulley, a main gear, and an auxiliary gear. The main belt pulley is mounted with the auxiliary transmission shaft. The auxiliary belt pulley is fixed with an outer wall of a bearing of the auxiliary transmission shaft through a fixed rod. The main gear is provided on the auxiliary belt pulley. The auxiliary gear is provided on a transmission shaft of the sewage discharge conveyor belt. The main gear is engaged with the auxiliary gear. The main belt pulley is connected to the auxiliary belt pulley through a belt.

Preferably, the water conveyance mechanism includes a water turbine and a water conveyance tank. The water turbine is provided on the main transmission shaft. The water conveyance tank includes one end communicating with the water inlet, and the other end communicating with the water discharge mechanism. The water conveyance tank is fixed on the bracket.

Preferably, the filtration mechanism includes a sewage discharge plate, a filtering blade, a sewage discharge plate connecting shaft, and a filtering disc. The filtering blade and the filtering disc are respectively fixed on the main transmission shaft through a sleeve. A fixed projection is provided on the main transmission shaft. A sleeve positioning groove is formed in the sleeve. The sewage discharge plate is fixed on the filtering blade through the sewage discharge plate connecting shaft. The sewage discharge plate connecting shaft has a structure rotating unidirectionally by a fixed angle. The filtering disc is provided outside the water inlet, and is in contact with the water inlet. And a diameter of the filtering disc is slightly less than a diameter of the water inlet.

Preferably, the water guidance mechanism includes a plate inclining outwardly from the main water baffle.

Preferably, the water discharge mechanism includes a water storage tank, a water discharge pump, and a water discharge port. The water storage tank and the water discharge pump are provided on the support base. The water discharge port is formed in the water storage tank.

The present disclosure has the following beneficial effects:

1. The unpowered-filtering sewage cleaning device provided by the present disclosure can be combined modularly. In case of no waterlogging drainage, it can be used solely for sewage cleaning to remove sewage from relevant water areas. In case of waterlogging drainage, it performs both the waterlogging drainage and the sewage cleaning. Specifically, upon completion of the sewage cleaning on the water, the unpowered-filtering sewage cleaning device performs the waterlogging drainage to prevent the sewage in the water from affecting the waterlogging drainage and achieve a high utilization rate.

2. The filtration mechanism and the sewage discharge mechanism can completely utilize a kinetic energy of water in the water conveyance mechanism, and do not need additional device and power.

3. The water guidance mechanism can adjust a control range of the system, and guide the water and sewage, for ease of waterlogging drainage and sewage cleaning.

4. The unpowered-filtering sewage cleaning device can serve as both a mobile platform and a fixed platform, with a wide application range. It can be used on land and water, with a strong environmental adaptability.

5. The unpowered-filtering sewage cleaning device can be taken as a conventional product for use in a water passage and a ditch, and as an emergency device for use.

6. The unpowered-filtering sewage cleaning device has a simple structure, easy maintenance and a high degree of automation, can reduce a workload of the operator to a great extent, and operates efficiently, stably and safely.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

1: water discharge pump, 2: water storage tank, 3: bracket, 4: suspension mechanism, 5: filtering disc, 6: sleeve positioning groove, 7: main water baffle, 8: sewage discharge port, 9: sewage discharge plate connecting shaft, 10: sewage discharge plate, 11: water guidance mechanism, 12: filtering blade, 13: main transmission shaft, 14: fixed projection, 15: sleeve, 16: water discharge port, 17: support base, 18: main belt pulley, 19: auxiliary gear, 20: sewage discharge tank, 21: main gear, 22: auxiliary belt pulley, 23: sewage discharge conveyor belt, 24: water conveyance tank, 25: filtering disc support rod, 26: support ring, 27: spindle support rod, 28: water turbine, 29: pressure rod, 30: clutch mechanism, 31: clutch mechanism case, 32: reset spring, 33: disengagement sleeve, 34: auxiliary transmission shaft, 35: push rod, 36: main pressure plate, 37: friction piece, 38: auxiliary pressure plate, 39: pressure plate positioning groove, 40: positioning post, and 41: positioning plate.

DETAILED DESCRIPTION OF THE EMBODIMENTS

The technical solutions in the embodiments of the present disclosure will be clearly and completely described below by referring to the accompanying drawings in the embodiments of the present disclosure. The described embodiments are only a part of, not all, the embodiments of the present disclosure. All other embodiments obtained by those of ordinary skill in the art based on the embodiments of the present disclosure without creative efforts shall fall within the protection scope of the present disclosure.

Embodiment 1

Figure 1:
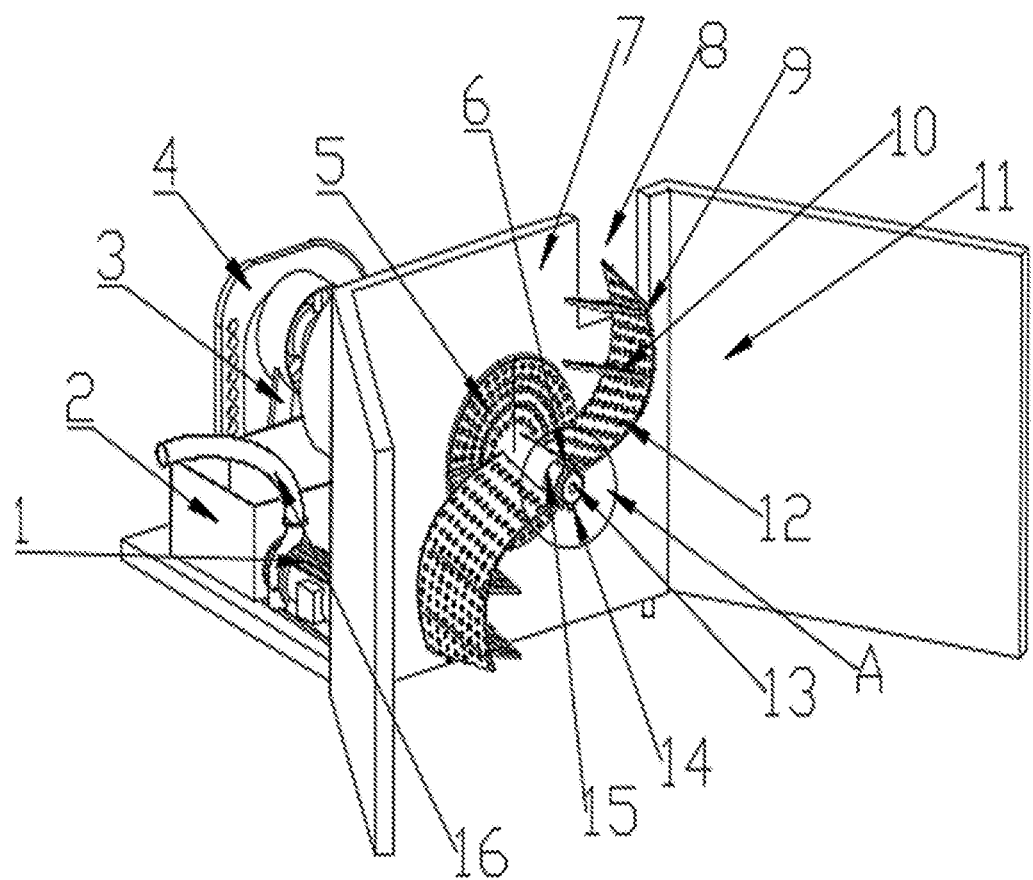
FIG. 1 is a structural perspective view of an unpowered-filtering sewage cleaning device according to the present disclosure.
Figure 2:
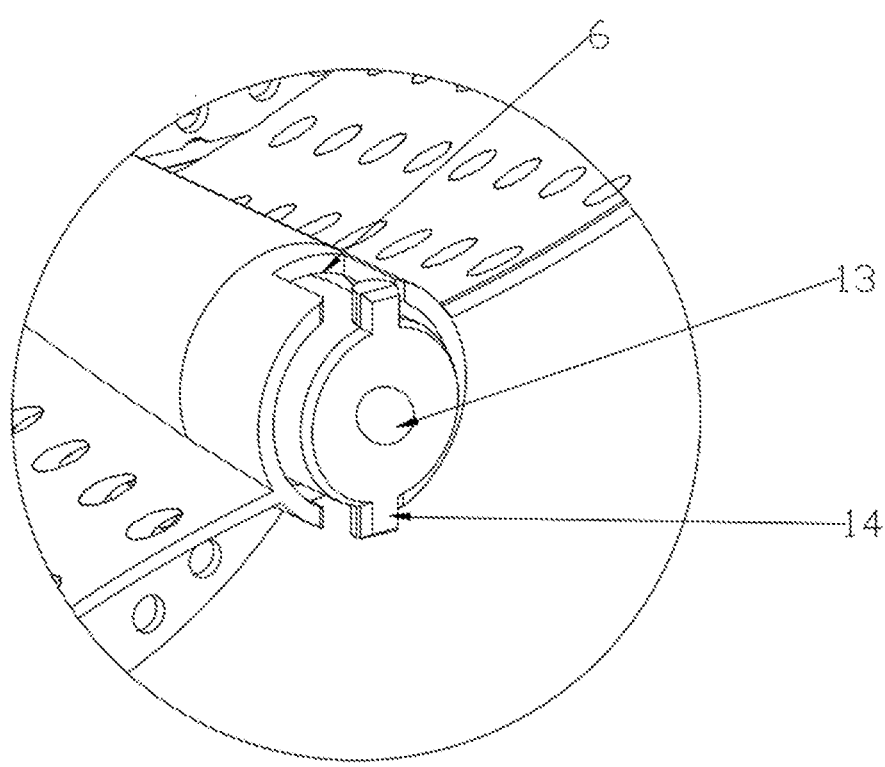
FIG. 2 is an enlarged structural view of portion A in FIG. 1.
Figure 3:
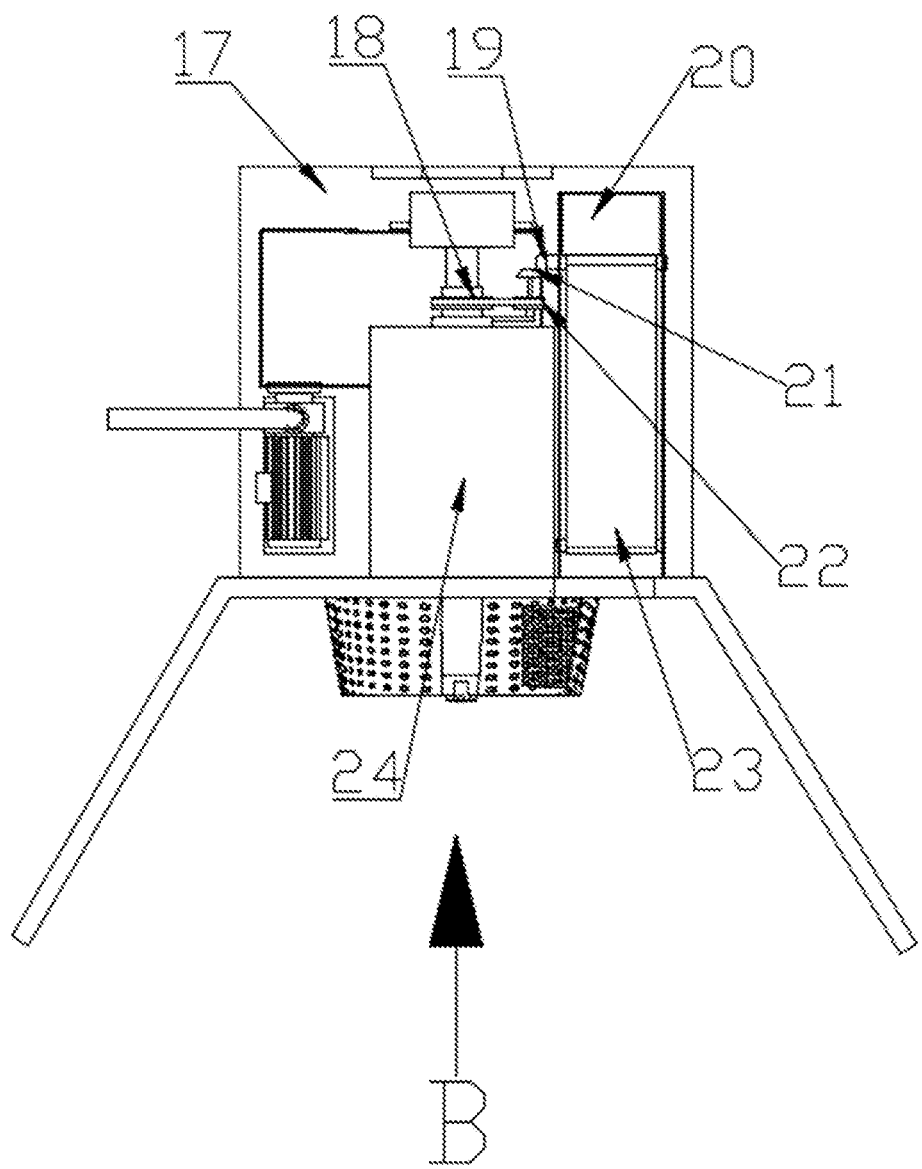
FIG. 3 is a planar structural view of an unpowered-filtering sewage cleaning device according to the present disclosure.
Figure 4:
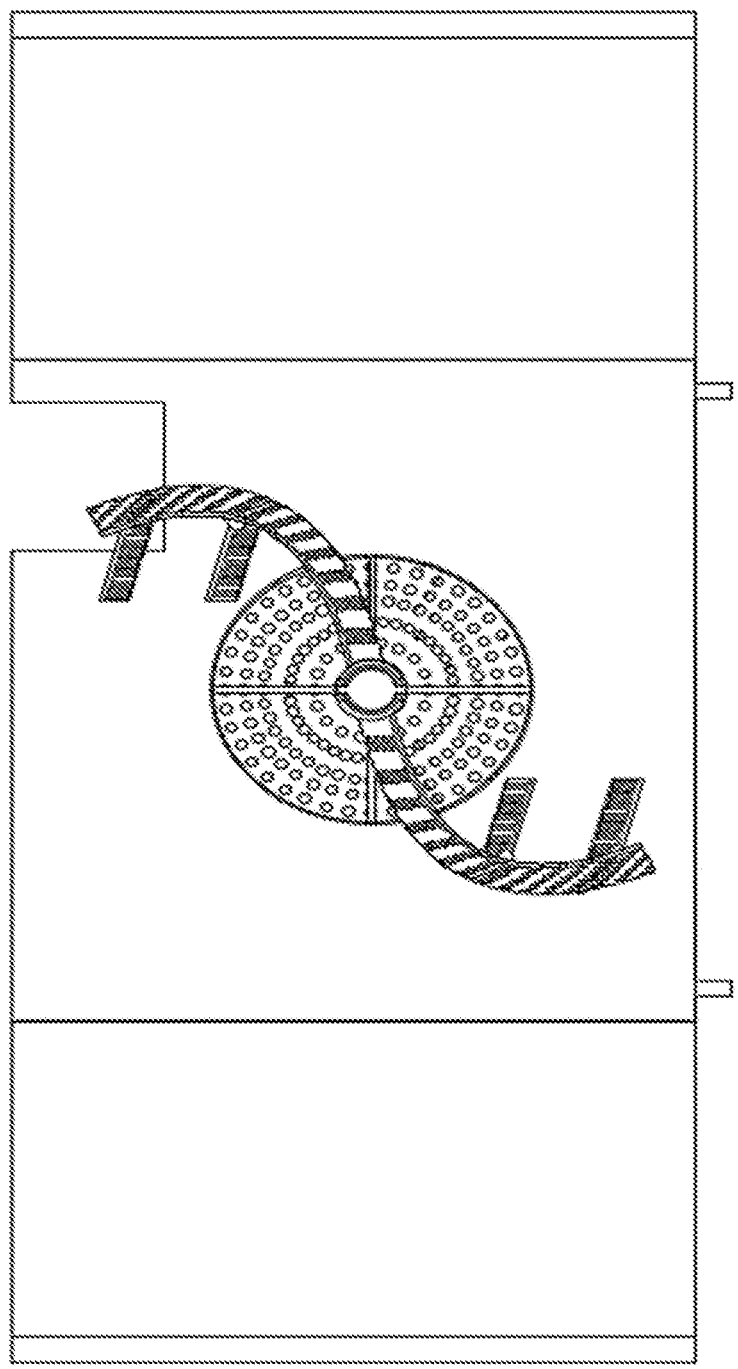
FIG. 4 is a structural view of from direction B as shown in FIG. 3.
Figure 5:
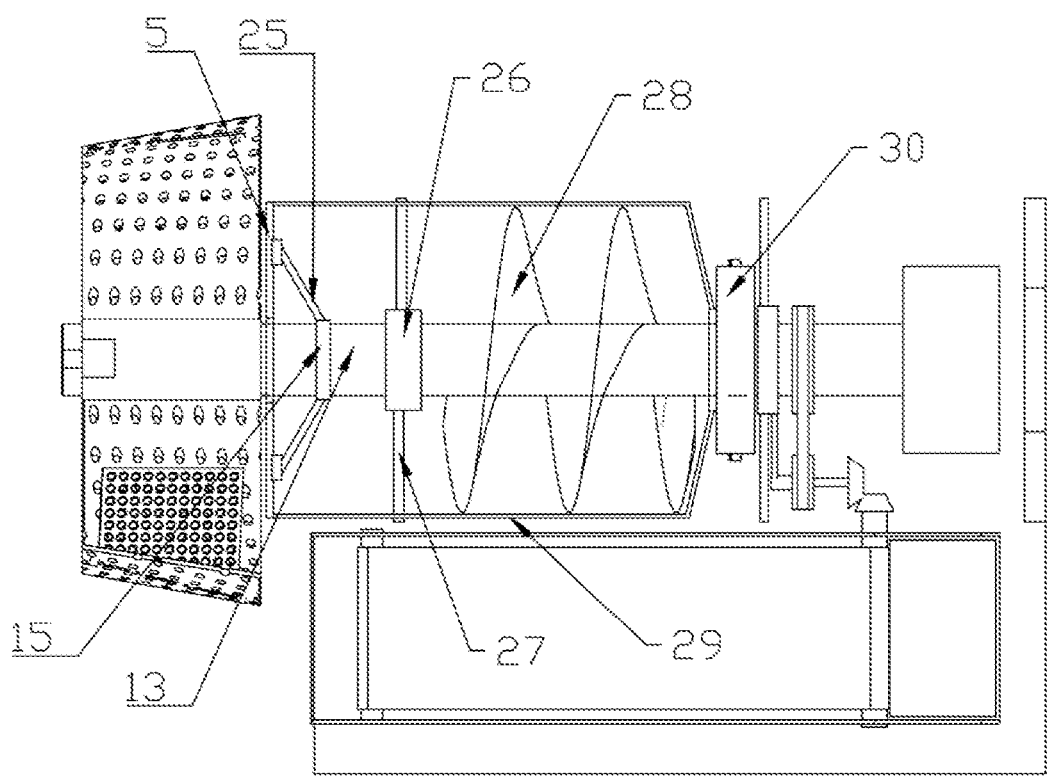
FIG. 5 is a schematic structural view of a transmission mechanism according to the present disclosure.
Figure 6:
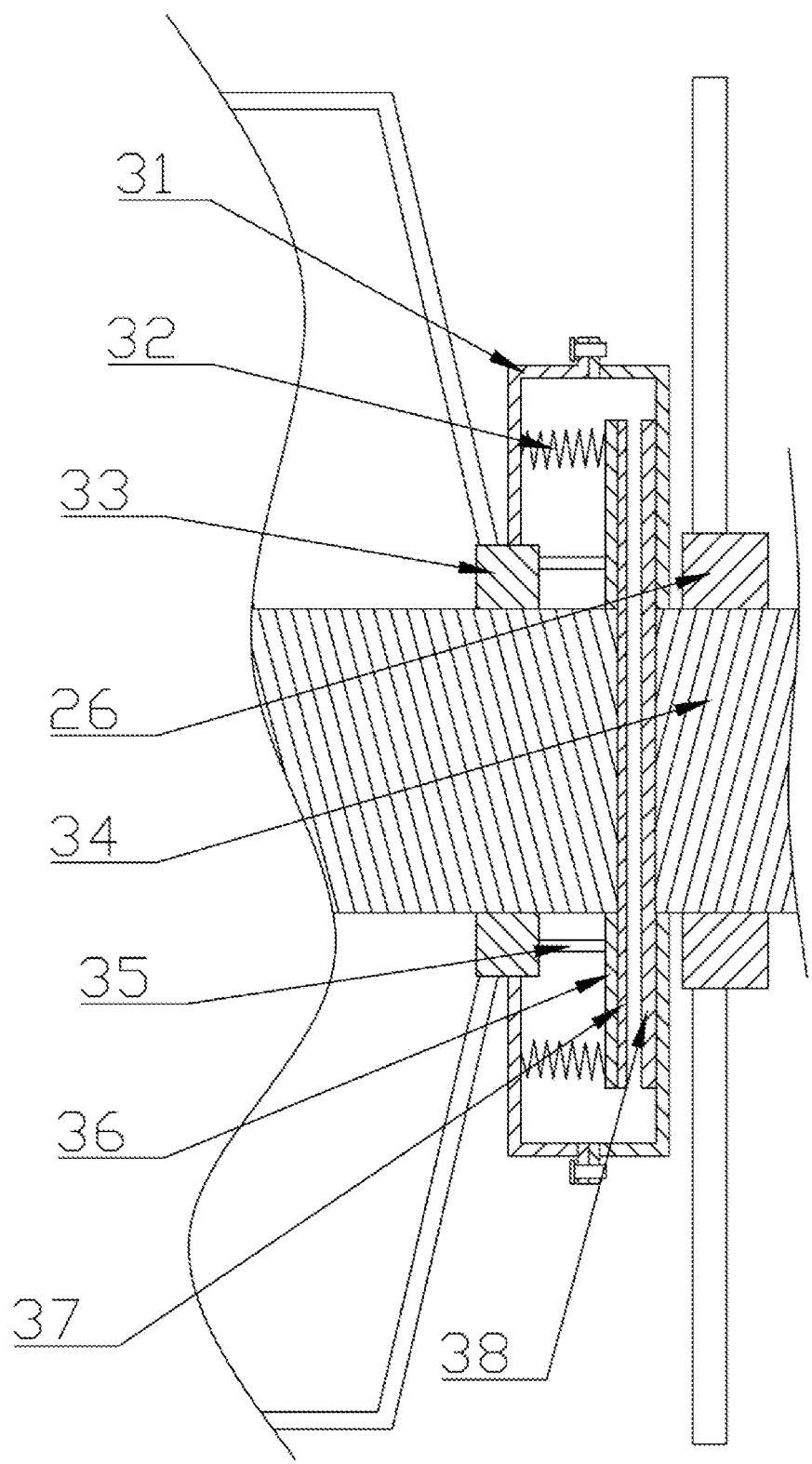
FIG. 6 is a schematic structural view of a clutch mechanism according to the present disclosure.

As shown in FIGS. 1-6, an unpowered-filtering sewage cleaning device includes a sewage discharge mechanism, a water conveyance mechanism, a filtration mechanism, water guidance mechanism 11, a water discharge mechanism, a support mechanism, and a transmission mechanism. The support mechanism includes suspension mechanism 4, sewage discharge port 8, a water inlet, main water baffle 7, support base 17, and bracket 3. The suspension mechanism 4 and the bracket 3 are fixed on the support base 17. The main water baffle 7 is rigidly connected to the support base 17. The sewage discharge port 8 and the water inlet are positioned on the main water baffle 7. The bracket 3 provides support for all components of the device. The suspension mechanism 4 is configured to fix and mount an apparatus. In the embodiment, the suspension mechanism 4 is a U-shaped plate fixed on the support base 17. With the suspension mechanism 4, the unpowered-filtering sewage cleaning device provided by the present disclosure can be suspended in front of a vehicle or a ship, and can also be fixed at a water discharge position of a bridge, a culvert, and the like. The height of the system above the water surface can be adjusted freely to make a water flow lower than the sewage discharge port.

The system suspended on the vehicle or fixed on the ground can be used for water conveyance, waterlogging drainage, and sewage filtration from water in urban and rural areas. When provided at the water discharge position of the bridge and the culvert, the system can automatically filter sewage in water to ensure safety of the water system. The system in front of the ship can remove sewage from relevant water areas without additional power and device.

The water conveyance mechanism includes water turbine 28, and water conveyance tank 24. The water turbine 28 is provided on main transmission shaft 13. The water conveyance tank 24 includes one end communicating with the water inlet, and the other end communicating with the water discharge mechanism. The water conveyance tank 24 is fixed on the bracket 3.

The water guidance mechanism 11 includes a plate inclining outwardly from the main water baffle 7, and is configured to adjust a water guiding area of the whole device.

The water discharge mechanism includes water storage tank 2, water discharge pump 1, and water discharge port 16. The water storage tank 2 and the water discharge pump 1 are provided on the support base 17. The water discharge port 16 is formed in the water storage tank 2. In case of the sewage cleaning of the system, the water discharge pump 1 does not work, but the water discharge port 16 is opened, such that filtered water is directly discharged from the system through the water discharge port 16. In case of the waterlogging drainage of the system, the water discharge port 16 is closed, while the water discharge pump 1 works for the waterlogging drainage.

The transmission mechanism includes main transmission shaft 13, clutch mechanism 30, and auxiliary transmission shaft 34. The main transmission shaft 13 is mounted with the auxiliary transmission shaft 34 through the clutch mechanism 30. In case of disengagement of the clutch mechanism 30, the main transmission shaft 13 rotates, while the auxiliary transmission shaft 34 does not rotate. In case of engagement of the clutch mechanism 30, the main transmission shaft 13 drives the auxiliary transmission shaft 34 to rotate coaxially. Spindle support ring 26 is respectively provided on the main transmission shaft 13 and the auxiliary transmission shaft 34. The spindle support ring 26 is fixed with the water conveyance tank 24 through spindle support rod 27. The spindle support ring 26 is sleeved on the main transmission shaft 13 or the auxiliary transmission shaft 34. The main transmission shaft 13 and the auxiliary transmission shaft 34 each may slide within the spindle support ring 26. An end of the auxiliary transmission shaft 34 away from the clutch mechanism 30 is fixed on the bracket 3 through a bearing. In the embodiment, a protective cover is provided outside the bearing. The water conveyance mechanism, the filtration mechanism, and the water guidance mechanism 11 are mounted with the main transmission shaft 13. The sewage discharge mechanism is mounted with the auxiliary transmission shaft 34.

The clutch mechanism 30 is intended to control disengagement and engagement between the main transmission shaft 13 and the auxiliary transmission shaft 34. The clutch mechanism includes clutch mechanism case 31, pressure rod 29, disengagement sleeve 33, main pressure plate 36, friction piece 37, auxiliary pressure plate 38, and reset spring 32. The disengagement sleeve 33 penetrates the clutch mechanism case 31 and extends into the clutch mechanism case 31. The disengagement sleeve 33 is fixed with the main pressure plate 36 through push rod 35. The reset spring 32 includes one end fixed on the clutch mechanism case 31, and the other end fixed on the main pressure plate 36. The main transmission shaft 13 passes through the disengagement sleeve 33 and the main pressure plate 36 to be fixed with the friction piece 37. The auxiliary transmission shaft 34 passes through the clutch mechanism case 31 to be fixed with the auxiliary pressure plate 38. One end of the pressure rod 29 is fixed with a portion of the disengagement sleeve 33 out of the clutch mechanism case 31. The other end of the pressure rod 29 is mounted with the filtration mechanism. The main transmission shaft 13 is mounted with the filtering disc 5. In case of a smaller water flow or less sewage in the water, only the filtering disc 5 works. The water enters the water conveyance tank 24 through the filtering disc 5. The water turbine 28 is pushed to rotate, thereby conveying filtered water to the water storage tank 2. The filtering disc 5 filters the sewage continuously in operation. With the elapse of time, the water pushes the filtering disc 5 to move backward for an increasingly large resistance. The filtering disc 5 drives the disengagement sleeve 33 to move backward through the pressure rod 29. The disengagement sleeve 33 drives the main pressure plate 36 to move backward through the push rod 35. The main pressure plate 36 drives the main transmission shaft 13 to move backward through the friction piece 37. Consequently, the friction piece 37 is in contact with the auxiliary pressure plate 38. Under a frictional force between the friction piece 37 and the auxiliary pressure plate 38, the main pressure plate 36 drives the auxiliary pressure plate 38 to rotate, thereby driving the auxiliary transmission shaft 34 to rotate. In this process, the reset spring 32 is extended.

The clutch mechanism case 31 is composed of front and rear case bodies. The front and rear case bodies are fixed together through a bolt and a nut, which facilitates installation and maintenance of other components of the clutch mechanism.

When the pressure of the water flow is reduced, the main pressure plate 36 moves forward under the reset spring 32. As a result, the friction piece 37 is disengaged from the auxiliary pressure plate 38, the auxiliary transmission shaft 34 stops to rotate, and the spring is reset.

The sewage discharge mechanism includes sewage discharge conveyor belt 23, an automatic sewage discharge mechanism, and sewage discharge tank 20. The sewage discharge conveyor belt 23 and the sewage discharge tank 20 are provided on the support base 17. One end of the sewage discharge conveyor belt 23 is provided under the sewage discharge port 8. The sewage discharge port is higher than the filtering disc, so as to ensure that the water does not flow from the sewage discharge port. The other end of the sewage discharge conveyor belt 23 is provided on the sewage discharge tank 20. The automatic sewage discharge mechanism includes main belt pulley 18, auxiliary belt pulley 22, main gear 21, and auxiliary gear 19. The main belt pulley 18 is mounted with the auxiliary transmission shaft 34. The auxiliary belt pulley 22 is fixed with the support ring 26 of the auxiliary transmission shaft 34 through a fixed rod. The main gear 21 is provided on the auxiliary belt pulley 22. The auxiliary gear 19 is provided on a transmission shaft of the sewage discharge conveyor belt 23. The main gear 21 is engaged with the auxiliary gear 19. The main belt pulley 18 is connected to the auxiliary belt pulley 22 through a belt.

The main gear 21 and the auxiliary gear 19 are provided as required actually, and both are a bevel gear in the embodiment.

The automatic sewage discharge mechanism does not work in case of no sewage cleaning. When the water and the sewage generate a certain pressure on the water conveyance mechanism, the main transmission shaft 13 and the auxiliary transmission shaft 34 work under the clutch mechanism. The main transmission shaft 13 drives the auxiliary transmission shaft 34 to move coaxially. The bevel gear on the auxiliary belt pulley 22 is connected to the bevel gear on the sewage discharge conveyor belt 23. The sewage discharge conveyor belt 23 is driven for the sewage cleaning.

The filtration mechanism includes sewage discharge plate 10, filtering blade 12, sewage discharge plate connecting shaft 9, and filtering disc 5. The filtering blade 12 is fixed on the main transmission shaft 13 through sleeve 15. The filtering blade has a turbine blade structure, with a certain inclination angle relative to the sleeve. Filtering holes are formed in the filtering blade. The water can push the filtering blade to rotate. Filtering holes are formed in the sewage discharge plate. The filtering disc 5 is mounted with the main transmission shaft 13 through a bearing. Fixed projection 14 is provided on the main transmission shaft 13. Sleeve positioning groove 6 is formed in the sleeve 15. The sewage discharge plate is fixed on the filtering blade 12 through the sewage discharge plate connecting shaft 9. The sewage discharge plate connecting shaft 9 has a structure rotating unidirectionally by a fixed angle. The filtering disc 5 is provided outside the water inlet, and is in contact with the water inlet. A diameter of the filtering disc 5 is slightly less than a diameter of the water inlet. The sewage discharge plate connecting shaft 9 has the structure rotating unidirectionally by the fixed angle, in which the angle is 5-60°, and 30° in the embodiment. When the sewage discharge plate connecting shaft moves with the filtering blade 12 to a lower half circle of the filtering disc 5, the sewage discharge plate gets close to the filtering blade 12 under gravity and the operating resistance of the sewage discharge plate. An acute angle between the sewage discharge plate and the filtering blade 12 becomes smaller until the sewage discharge plate is in contact with the filtering disc. When the sewage discharge plate connecting shaft moves with the filtering blade 12 to an upper half circle of the filtering disc 5, the sewage discharge plate gets away from the filtering blade 12 under gravity and the operating resistance. The acute angle between the sewage discharge plate and the filtering blade 12 becomes larger until a maximum angle. In this way, not only can the sewage in the water be filtered conveniently, but also the sewage filtered out from the water is conveyed easily to the sewage discharge mechanism.

The support mechanism is provided on the filtering disc 5 to stabilize the filtering disc 5, including the sleeve and the filtering disc support rod 25.

In case of the smaller water flow or the less sewage in the water, the main transmission shaft 13 rotates under a water-power, the filtering disc and the filtering blade 12 do not rotate, and the water enters the water conveyance tank 24 through the filtering disc. In case of a larger water flow and more sewage in the water, the filtering disc under an axial force pushes the filtering disc to move backward to enter the water inlet. The filtering disc drives the disengagement sleeve 33 to move backward through the pressure rod 29. The disengagement sleeve 33 drives the main pressure plate 36 to move backward through the push rod 35. The main pressure plate 36 drives the main transmission shaft 13 to move backward through the friction piece 37. Consequently, the friction piece 37 is in contact with the auxiliary pressure plate 38. Under a frictional force between the friction piece 37 and the auxiliary pressure plate 38, the main pressure plate 36 drives the auxiliary pressure plate 38 to rotate, thereby driving the auxiliary transmission shaft 34 to rotate. In this process, the reset spring 32 is extended. The fixed projection 14 on the main transmission shaft 13 enters the sleeve positioning groove 6 for fixation. The filtering blade 12 is driven to rotate for filtration of the sewage cleaning. When the water flow becomes smaller and the pressure of the filtering disc is reduced, the main pressure plate 36 moves forward under the reset spring 32. As a result, the friction piece 37 is disengaged from the auxiliary pressure plate 38, the auxiliary transmission shaft 34 stops to rotate, and the spring is reset. The fixed projection 14 is pushed out of the sleeve positioning groove 6, and the filtering blade 12 does not rotate.

The present disclosure has the following operation process:

(1) By providing the suspension mechanism 4 at a desired position, and ensuring that the sewage discharge port is higher than the water flow, the unpowered-filtering sewage cleaning device provided by the present disclosure can be used for filtration in the waterlogging drainage.

(2) Sewage to be filtered flows through the filtering plate and the filtering disc. After sewage are filtered, water enters the water conveyance tank 24. The water pushes the water turbine 28 to rotate for water conveyance. The clutch mechanism is disengaged, and the filtered water is conveyed to the water storage tank.

(3) With the elapse of time, the sewage on the filtering disc are increased, the filtering disc is pushed by a pressure to move backward, and thus the clutch mechanism is engaged. The main transmission shaft 13 drives the auxiliary transmission shaft 34 to rotate coaxially, thereby driving the sewage discharge conveyor belt 23 to move. The fixed projection 14 on the main transmission shaft 13 enters the sleeve positioning groove 6 for fixation. The filtering blade 12 is driven to rotate for the filtration of the sewage cleaning. The sewage filtered out from the water falls onto the sewage discharge conveyor belt 23 through the sewage discharge port 8. Through the sewage discharge conveyor belt 23, the sewage are conveyed to the sewage discharge tank 20.

(4) While the sewage are discharged, the pressure applied to the filtering disc is reduced. The clutch mechanism is disengaged under the reset spring 32. The main transmission shaft 13 rotates for continuous filtration, while the auxiliary transmission shaft 34 does not rotate. As such, the sewage is filtered and cleaned.

The filtration mechanism and the sewage discharge mechanism can completely utilize a kinetic energy of water in the water conveyance mechanism, and do not need additional device and power. The unpowered-filtering sewage cleaning device has a simple structure, easy maintenance and a high degree of automation, can reduce a workload of the operator to a great extent, and operates efficiently, stably and safely.

Embodiment 2

Figure 7:
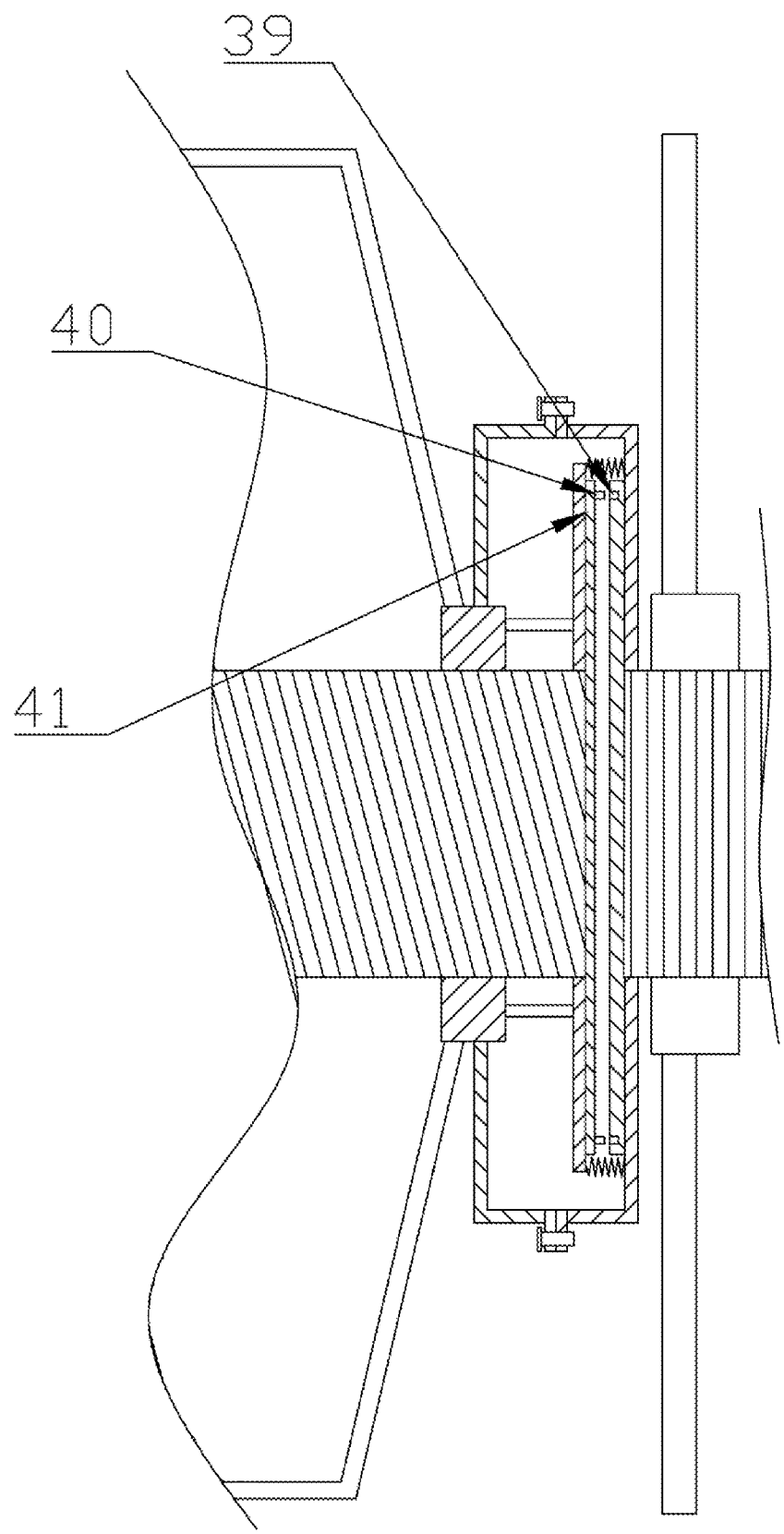
FIG. 7 is another schematic structural view of a clutch mechanism according to the present disclosure.

As shown in FIGS. 1-5 and FIG. 7, the embodiment is basically the same as Embodiment 1, but differs in: The clutch mechanism includes clutch mechanism case 31, pressure rod 29, disengagement sleeve 33, main pressure plate 36, positioning plate 41, auxiliary pressure plate 38, and reset spring 32. The disengagement sleeve 33 penetrates the clutch mechanism case 31 and extends into the clutch mechanism case 31. The disengagement sleeve 33 is fixed with the main pressure plate 36 through push rod 35. The reset spring 32 includes one end fixed on the clutch mechanism case 31, and the other end fixed on the main pressure plate 36. Positioning post is provided on the positioning plate 41. Pressure plate positioning groove 39 is formed in the auxiliary pressure plate 38. The main transmission shaft 13 passes through the disengagement sleeve 33 and the main pressure plate 36 to be fixed with the positioning plate. The auxiliary transmission shaft 34 passes through the clutch mechanism case 31 to be fixed with the auxiliary pressure plate 38. One end of the pressure rod 29 is fixed with a portion of the disengagement sleeve 33 out of the clutch mechanism case 31. The other end of the pressure rod 29 is mounted with the filtration mechanism. The size of the pressure plate positioning groove 39 depends on the positioning post 40, such that the positioning post 40 moves into the pressure plate positioning groove 39 more easily to prolong the service life. In Embodiment 1, the friction piece 37 and the auxiliary pressure plate 38 are fixed together through the frictional force so the structure is not very stable, and high requirements are imposed on the materials of the friction piece 37 and the auxiliary pressure plate 38. Through a structure of inserting the positioning post 40 into the pressure plate positioning groove 39, the embodiment achieves a simple structure and stable fixation.

Although embodiments of the present disclosure are described above, modifications and replacements made by a person skilled in the art without departing from the principle and spirit of the present disclosure fall within the protection scope of the present disclosure.

What is claimed is:

1. An unpowered-filtering sewage cleaning device, comprising a sewage discharge mechanism, a water conveyance mechanism, a filtration mechanism, a water guidance mechanism, a water discharge mechanism, a support mechanism, and a transmission mechanism, wherein the support mechanism comprises a suspension mechanism, a sewage discharge port, a water inlet, a main water baffle, a support base, and a bracket; the suspension mechanism and the bracket are fixed on the support base; the main water baffle is rigidly connected to the support base; the sewage discharge port and the water inlet are positioned on the main water baffle; the bracket provides support for all components of the unpowered-filtering sewage cleaning device; the suspension mechanism is configured to fix and mount an apparatus;

the transmission mechanism comprises a main transmission shaft, a clutch mechanism, and an auxiliary transmission shaft; the main transmission shaft is mounted with the auxiliary transmission shaft through the clutch mechanism; in case of disengagement of the clutch mechanism, the main transmission shaft rotates, while the auxiliary transmission shaft does not rotate; in case of engagement of the clutch mechanism under a pressure, the main transmission shaft drives the auxiliary transmission shaft to rotate coaxially; the water conveyance mechanism, the filtration mechanism, and the water guidance mechanism are mounted with the main transmission shaft; and the sewage discharge mechanism is mounted with the auxiliary transmission shaft;

the clutch mechanism comprises a clutch mechanism case, a pressure rod, a disengagement sleeve, a main pressure plate, a friction piece, an auxiliary pressure plate, and a reset spring; the disengagement sleeve penetrates the clutch mechanism case and extends into the clutch mechanism case; the disengagement sleeve is fixed with the main pressure plate through a push rod; the reset spring comprises a first end fixed on the clutch mechanism case, and a second end fixed on the main pressure plate; the main transmission shaft passes through the disengagement sleeve and the main pressure plate to be fixed with the friction piece; the auxiliary transmission shaft passes through the clutch mechanism case to be fixed with the auxiliary pressure plate; a first end of the pressure rod is fixed with a portion of the disengagement sleeve, wherein the portion of the disengagement sleeve is located outside the clutch mechanism case, and a second end of the pressure rod is mounted with the filtration mechanism;

the sewage discharge mechanism comprises a sewage discharge conveyor belt, an automatic sewage discharge mechanism, and a sewage discharge tank; the sewage discharge conveyor belt and the sewage discharge tank are provided on the support base; a first end of the sewage discharge conveyor belt is provided under the sewage discharge port, and a second end of the sewage discharge conveyor belt is provided on the sewage discharge tank; the automatic sewage discharge mechanism comprises a main belt pulley, an auxiliary belt pulley, a main gear, and an auxiliary gear; the main belt pulley is mounted with the auxiliary transmission shaft; the auxiliary belt pulley is fixed with an outer wall of a bearing of the auxiliary transmission shaft through a fixed rod; the main gear is provided on the auxiliary belt pulley; the auxiliary gear is provided on a transmission shaft of the sewage discharge conveyor belt; the main gear is engaged with the auxiliary gear; and the main belt pulley is connected to the auxiliary belt pulley through a belt;

the water conveyance mechanism comprises a water turbine and a water conveyance tank; the water turbine is provided on the main transmission shaft; the water conveyance tank comprises a first end communicating with the water inlet, and a second end communicating with the water discharge mechanism; and the water conveyance tank is fixed on the bracket;

the filtration mechanism comprises a sewage discharge plate, a filtering blade, a sewage discharge plate connecting shaft, and a filtering disc; the filtering blade and the filtering disc are respectively fixed on the main transmission shaft through a sleeve; the filtering blade has a turbine blade structure, with a certain inclination angle relative to the sleeve; a fixed projection is provided on the main transmission shaft; a sleeve positioning groove is formed in the sleeve; the sewage discharge plate is fixed on the filtering blade through the sewage discharge plate connecting shaft; the sewage discharge plate connecting shaft has a structure rotating unidirectionally by a fixed angle; the filtering disc is provided outside the water inlet, and the filtering disc is in contact with the water inlet; and a diameter of the filtering disc is slightly less than a diameter of the water inlet; and the water discharge mechanism comprises a water storage tank, a water discharge pump, and a water discharge port; the water storage tank and the water discharge pump are provided on the support base; and the water discharge port is formed in the water storage tank.

2. The unpowered-filtering sewage cleaning device according to claim 1, wherein the water guidance mechanism comprises a plate connected to the main water baffle and inclining outwardly from the main water baffle.

3. An unpowered-filtering sewage cleaning device, comprising a sewage discharge mechanism, a water conveyance mechanism, a filtration mechanism, a water guidance mechanism, a water discharge mechanism, a support mechanism, and a transmission mechanism, wherein the support mechanism comprises a suspension mechanism, a sewage discharge port, a water inlet, a main water baffle, a support base, and a bracket; the suspension mechanism and the bracket are fixed on the support base; the main water baffle is rigidly connected to the support base; the sewage discharge port and the water inlet are positioned on the main water baffle; the bracket provides support for all components of the unpowered-filtering sewage cleaning device; the suspension mechanism is configured to fix and mount an apparatus;

the transmission mechanism comprises a main transmission shaft, a clutch mechanism, and an auxiliary transmission shaft; the main transmission shaft is mounted with the auxiliary transmission shaft through the clutch mechanism; in case of disengagement of the clutch mechanism, the main transmission shaft rotates, while the auxiliary transmission shaft does not rotate; in case of engagement of the clutch mechanism under a pressure, the main transmission shaft drives the auxiliary transmission shaft to rotate coaxially; the water conveyance mechanism, the filtration mechanism, and the water guidance mechanism are mounted with the main transmission shaft; and the sewage discharge mechanism is mounted with the auxiliary transmission shaft;

the clutch mechanism comprises a clutch mechanism case, a pressure rod, a disengagement sleeve, a main pressure plate, a positioning plate, an auxiliary pressure plate, and a reset spring; the disengagement sleeve penetrates the clutch mechanism case and extends into the clutch mechanism case; the disengagement sleeve is fixed with the main pressure plate through a push rod; the reset spring comprises a first end fixed on the clutch mechanism case, and a second end fixed on the main pressure plate; a positioning post is provided on the positioning plate; a pressure plate positioning groove is formed in the auxiliary pressure plate; the main transmission shaft passes through the disengagement sleeve and the main pressure plate to be fixed with the positioning plate; the auxiliary transmission shaft passes through the clutch mechanism case to be fixed with the auxiliary pressure plate; a first end of the pressure rod is fixed with a portion of the disengagement sleeve, wherein the portion of the disengagement sleeve is located outside the clutch mechanism case, and a second end of the pressure rod is mounted with the filtration mechanism;

the sewage discharge mechanism comprises a sewage discharge conveyor belt, an automatic sewage discharge mechanism, and a sewage discharge tank; the sewage discharge conveyor belt and the sewage discharge tank are provided on the support base; a first end of the sewage discharge conveyor belt is provided under the sewage discharge port, and a second end of the sewage discharge conveyor belt is provided on the sewage discharge tank; the automatic sewage discharge mechanism comprises a main belt pulley, an auxiliary belt pulley, a main gear, and an auxiliary gear; the main belt pulley is mounted with the auxiliary transmission shaft; the auxiliary belt pulley is fixed with an outer wall of a bearing of the auxiliary transmission shaft through a fixed rod; the main gear is provided on the auxiliary belt pulley; the auxiliary gear is provided on a transmission shaft of the sewage discharge conveyor belt; the main gear is engaged with the auxiliary gear; and the main belt pulley is connected to the auxiliary belt pulley through a belt;

the water conveyance mechanism comprises a water turbine and a water conveyance tank; the water turbine is provided on the main transmission shaft; the water conveyance tank comprises a first end communicating with the water inlet, and a second end communicating with the water discharge mechanism; and the water conveyance tank is fixed on the bracket;

the filtration mechanism comprises a sewage discharge plate, a filtering blade, a sewage discharge plate connecting shaft, and a filtering disc; the filtering blade and the filtering disc are respectively fixed on the main transmission shaft through a sleeve; the filtering blade has a turbine blade structure, with a certain inclination angle relative to the sleeve; a fixed projection is provided on the main transmission shaft; a sleeve positioning groove is formed in the sleeve; the sewage discharge plate is fixed on the filtering blade through the sewage discharge plate connecting shaft; the sewage discharge plate connecting shaft has a structure rotating unidirectionally by a fixed angle; the filtering disc is provided outside the water inlet, and the filtering disc is in contact with the water inlet; and a diameter of the filtering disc is slightly less than a diameter of the water inlet; and the water discharge mechanism comprises a water storage tank, a water discharge pump, and a water discharge port; the water storage tank and the water discharge pump are provided on the support base; and the water discharge port is formed in the water storage tank.

4. The unpowered-filtering sewage cleaning device according to claim 3, wherein the water guidance mechanism comprises a plate connected to the main water baffle and inclining outwardly from the main water baffle.

* * * * *